No. 797,880. PATENTED AUG. 22, 1905.
R. WILLETTS.
CONNECTING ROD FOR TRUNK PISTONS.
APPLICATION FILED APR. 22, 1905.
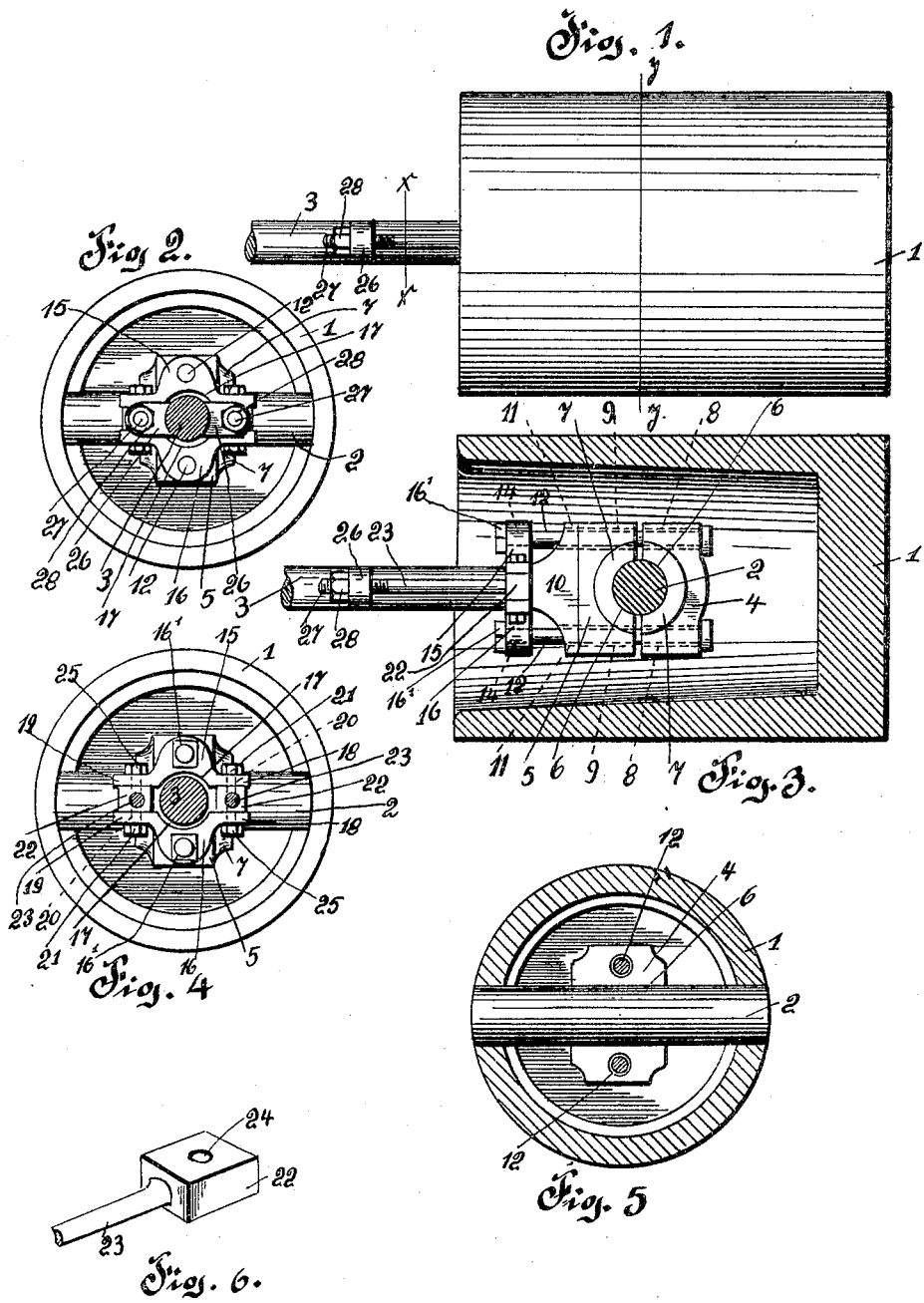
Witnesses:
Inventor.
R. Willetts.
by Evert & Co.
Attorneys.

UNITED STATES PATENT OFFICE.

REUBEN WILLETTS, OF BUTLER, PENNSYLVANIA.

CONNECTING-ROD FOR TRUNK-PISTONS.

No. 797,880. Specification of Letters Patent. Patented Aug. 22, 1905.

Application filed April 22, 1905. Serial No. 256,881.

*To all whom it may concern:*

Be it known that I, REUBEN WILLETTS, a citizen of the United States of America, residing at Butler, in the county of Butler and State of Pennsylvania, have invented certain new and useful Improvements in Connecting-Rods for Trunk-Pistons, of which the following is a specification, reference being had therein to the accompanying drawings.

This invention relates to certain new and useful improvements in connecting-rods for trunk-pistons; and the object of the invention is the provision of a novel form of connecting-rod the brasses of which can be easily and quickly adjusted from the exterior of the piston without necessitating the cessation of operation and the removal of the piston from its cylinder.

Another object of this invention is to provide a novel form of connection for connecting rods and pistons which will be extremely simple in construction, strong and durable, comparatively inexpensive to manufacture, and highly efficient for use in connection with trunk-pistons.

The invention consists in the novel construction, combination, and arrangement of parts, which will be hereinafter more fully described and then specifically pointed out in the claims, and, referring to the drawings accompanying this application, like numerals of reference designate corresponding parts throughout the several views, in which—

Figure 1 is a side elevation view of a trunk-piston equipped with my improved connecting-rod. Fig. 2 is an end view of the same. Fig. 3 is a longitudinal sectional view of a trunk-piston equipped with my improved connecting-rod. Fig. 4 is a cross-sectional view taken on the line $x\ x$ of Fig. 1. Fig. 5 is a similar view taken on the line $y\ y$ of Fig. 1, and Fig. 6 is a detail perspective view of a headed rod used in connection with my improved connecting-rods.

In the accompanying drawings I have illustrated the one end of my improved connecting-rod which is mounted within a trunk-piston 1, the opposite end of the connecting-rod being of the well-known and ordinary construction. The trunk-piston 1 is provided transversely of its interior with a pin 2, and centrally upon this pin the end of the connecting-rod 3 is adapted to be secured. To accomplish this, I employ brasses 4 and 5, the brasses 5 being carried by the end of the connecting-rod 3. Each brass is substantially block form, and their confronting faces are provided with transverse grooves 6 6, adapted to embrace the pin 2. The sides of the brasses bordering upon the grooves 6 6 are provided with strengthening-collars 7 7. Formed longitudinally through the brasses, preferably near the top and bottom edges thereof, are apertures 8 8 and 9 9. The flared enlarged end 10 of the connecting-rod 3 is provided with apertures 11 11, alining with the apertures 9 9 of the brass 5. Through the apertures 8, 9, and 11 are adapted to pass bolts 12 12, the ends of said bolts passing through apertures 14 14, formed in straps 15 and 16, mounted upon the connecting-rod 3. Nuts 16' 16' are employed for retaining the ends of the bolts 12 12 in engagement with the straps.

The straps 15 16 are grooved, as indicated at 17 17, to permit of the said straps being mounted in close proximity to the periphery of the connecting-rod 3 without engaging the same. The straps 15 16 carry outwardly-extending flanges 18 18 and 19 19, which are pierced, as indicated at 20 20, to receive headed bolts 21 21. Between the flanges 18 18 and 19 19 of the straps 15 16 are mounted heads 22 22, carried by rods 23 23. The heads 22 22 are provided with vertically-disposed apertures 24 24, through which the headed bolts 21 21 pass, nuts 25 25 being employed to retain the bolts 21 21 in engagement with the headed rods 23 and the straps 15 16. The diametrically-opposed sides of the rod 3 are provided with outwardly-extending pierced lugs 26 26, through which the screw-threaded ends 27 27 of the rods 23 23 are adapted to pass, nuts 28 28 being employed to retain the ends of the rods in engagement with the lugs.

It will be observed from the foregoing that I have devised novel means for adjustably mounting a brass within a trunk-piston, whereby it can be easily and quickly adjusted from without the piston. The construction of my improved connecting-rods enables an engineer or artisan to loosen or tighten the frictional contact of the brasses within a trunk-piston without necessitating a removal of the trunk-piston. The straps 15 16 being connected indirectly with the brass 4 and directly with the lugs 26 26 of the connecting-rod forms a connecting-link between the brass 4 and the ends of the rods 23 23, whereby when the nuts 28 28 are rotated the position of the straps 15 16 can be adjusted to tighten or relieve the brasses and engage the pin 2.

In connection with my improved connecting-rods for trunk-pistons I do not care to confine myself to the length of the rods 23, as in some instances these rods may extend a considerable distance along the connecting-rods in order that the brasses can be adjusted at a more convenient point in connection with the engine than if the lugs 26 26 were carried by the connecting-rod adjacent to the annular opening of the trunk-piston.

In describing my invention I have used the term "brasses" in its broad sense, meaning thereby the bearings which engage the cross-pin 2 of the piston, and I do not wish to be understood as confining myself to the use of a brass bearing by the use of this term, as these bearings are sometimes made of brass and are sometimes made of other metal having brass or babbitt-metal bearings therein.

While I have herein described the preferred manner of constructing my improved connecting-rod, it is obvious that various changes may be made in the details of construction without departing from the general spirit and scope of the invention.

What I claim, and desire to secure by Letters Patent, is—

1. In a connecting-rod, the combination with a trunk-piston having a transversely-disposed pin mounted therein, of brasses adapted to engage said pin, one of said brasses being carried by the end of said rod, said brasses having apertures formed therein, straps mounted upon said rod adjacent to one of said brasses, bolts passing through said apertures and engaging in said straps, lugs carried by said rod, headed rods passing through said lugs, the heads of said rods having apertures formed therein, bolts passing through said straps and said apertures, and means to adjust said rods within said lugs, substantially as described.

2. In a connecting-rod, the combination with a trunk-piston having a transversely-disposed pin mounted therein, of brasses adapted to engage said pin, one of said brasses being carried by the end of said rod, straps surrounding said rod, lugs carried by said rod, means to adjustably connect said straps to one of said brasses, and means to adjustably connect said straps to said lugs, substantially as described.

3. In a rod of the character described, the combination with a trunk-piston having a transversely-disposed pin mounted therein, of brasses adapted to engage said pin, one of said brasses being carried by the end of said rod, straps surrounding said rod, lugs carried by said rod, means mounted in said brasses, said straps and said lugs to adjust said brasses from the outside of said piston, substantially as described.

4. In combination with a trunk-piston, provided with a transversely-extending cross-rod having its ends mounted in the opposite side walls of the piston, of brasses engaging said cross-rod, a connecting-rod, straps spanning said connecting-rod, bolts connecting said straps to the connecting-rod, and bolts connecting the links to the brasses.

5. In combination with a trunk-piston having a cross-pin extending transversely thereof with its ends mounted in the walls of the piston, of brasses engaging said cross-pin, a connecting-rod, straps spanning the connecting-rod, means connecting said straps to the connecting-rod, and separate means connecting the straps, the connecting-rod and the brasses.

6. In a connecting-rod, the combination with the rod, of brasses, straps spanning the rod, means adjustably connecting the straps to the brasses, and separate means adjustably connecting the straps to the rod.

7. A rod of the character described, comprising a brass carried by the end of said rod, an adjustable brass, lugs carried by said rod, and means mounted between said adjustable rods and said lugs to move said brasses relatively to the first-named brass, substantially as described.

In testimony whereof I affix my signature in the presence of two witnesses.

REUBEN WILLETTS.

Witnesses:
ALBERT L. BOWSER,
FRANK KOHLER.